United States Patent Office 3,552,017
Patented Jan. 5, 1971

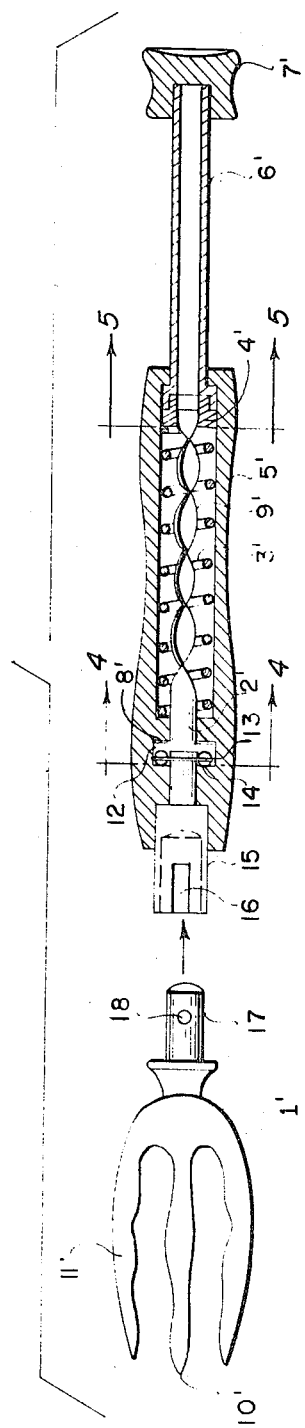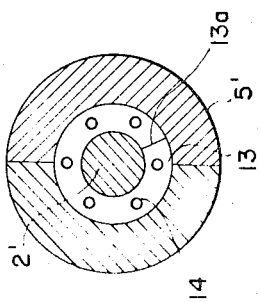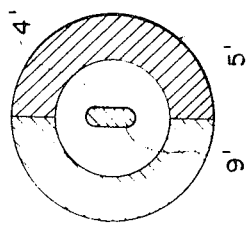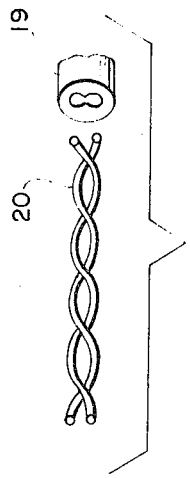

3,552,017
ROTATING CULINARY DEVICES, PARTICULARLY ROTATING SPAGHETTI FORKS
Israel Robert Smuts, Livingston, N.J., assignor of thirty-nine percent to Anthony W. Szabo and ten percent to Andrew E. Taylor
Filed Nov. 22, 1968, Ser. No. 778,211
Int. Cl. A47j 43/28
U.S. Cl. 30—322
16 Claims

ABSTRACT OF THE DISCLOSURE

A rotating culinary device, particularly a rotating spaghetti fork, has a tine assembly rotatably mounted in a handle against axial movement, an axially movable plunger having a threaded member cooperating with a threaded part of the tine assembly to effect rotation of the tine assembly, and a spring to return the plunger to its original position.

BACKGROUND OF THE INVENTION

This invention relates generally to rotating culinary devices, and more particularly to rotating spaghetti forks. So-called rotatable or rotating spaghetti forks have previously been proposed in numerous forms and arrangements. For example, in U.S. Pat. Nos. 2,748,479, 2,841,869, and 2,602,996 there are disclosed spaghetti forks wherein the tine portion of each fork is rotatable relative to the handle proper, the rotation being intended to be accomplished manually by rotating the tine portion with one or more fingers while grasping the handle proper with the other fingers and the palm of one hand. In U.S. Pat. No. 2,710,449 there is disclosed a fork having a rotatable tine portion formed with a spiraled or twisted stem extending therefrom, and a handle having an axial bore to receive the stem. The fork of this last mentioned patent, however, is somewhat awkward to use in that the tine assembly moves axially relative to the handle, and rotation is effected by pressing down on the handle while the tips of the tines are abutted against the plate. This forces the handle downwardly onto the stem, and rotates the tine portion of the fork. The tine assembly then must either be held in place manually, or it must be locked in place relative to the handle manually, or it must be locked in place relative to the handle before lifting the food from the plate. Thus, use of the fork of this patent seems to require either a great deal of patience, or unrealistic manual dexterity with one hand, or two-handed operation. To my knowledge, all such prior art rotating spaghetti forks have various such disadvantages, thus leaving considerable room for improvement in the art.

SUMMARY OF THE INVENTION

It is an object of this invention to provide a rotatable or rotating fork for use primarily in eating spaghetti or similar food, which fork may easily and quickly be actuated using only one hand.

It is another object of this invention to provide such a spaghetti fork wherein the tine portion is fixed against axial movement relative to the handle, and can be rotated merely by pressing down on a plunger located at the other end of the handle.

It is a further object of this invention to provide such a spaghetti fork with a spring to return the plunger to its original position immediately after its actuation, thus permitting the user to get promptly to the real business at hand, that of getting the food to the mouth neatly without an exasperating amount of concentration and manipulation.

Other objects, features and advantages of the invention will become readily apparent from the ensuing description, the accompanying drawings, and the appended claims.

Briefly summarized, the invention comprises a culinary device, particularly a rotating spaghetti fork, for one-handed use, comprising a tine assembly having a shaft threaded or similarly formed in its upper portion and rotatably mounted against axial movement within a handle, and a plunger having a similarly threaded or formed member engaging the shaft and axially movable relative to the shaft and handle.

DESCRIPTION OF THE DRAWINGS

FIG. 3 is a view, partially exploded and partially in section, of another embodiment of the invention.

FIG. 4 is a cross section taken along lines 4—4 of FIG. 3.

FIG. 5 is a cross section taken along lines 5—5 of FIG. 3.

FIG. 6 is a fragmentary illustration of a possible modification of either of the two embodiments.

DESCRIPTION OF THE PREFERRED EMBODIMENTS

Figure 1:
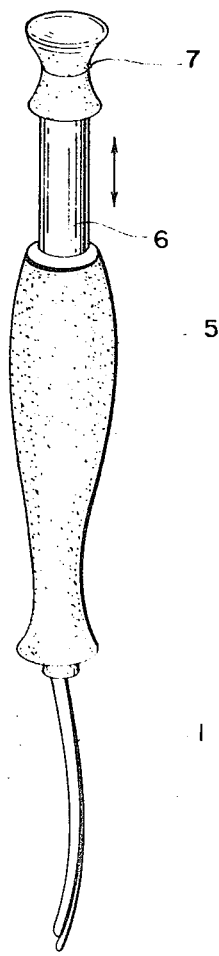
FIG. 1 is a side view of the improved rotating spaghetti fork.
Figure 2:
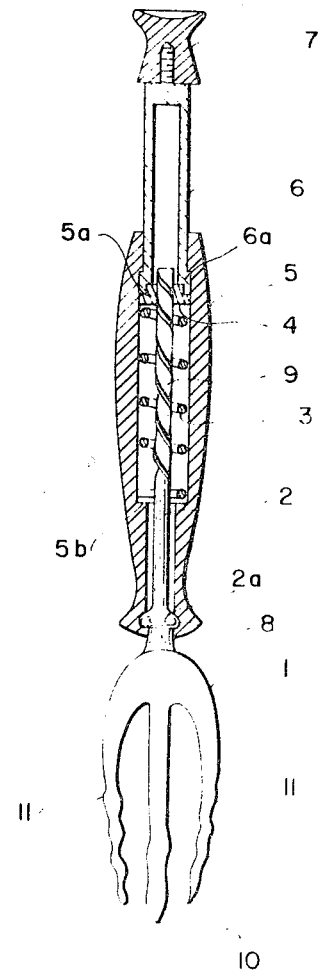
FIG. 2 is a partially sectioned view of the embodiment shown in FIG. 1.

Referring to FIGS. 1 and 2 of the drawings, the embodiment illustrated therein comprises a tine assembly designated generally 1, having a shaft 2 which is threaded or similarly formed in its upper portion 9. The tine assembly is rotatably mounted against axial movement in handle 5 by a convex bearing or flange 2a seated in concave bearing surface 8 formed in the lower part of handle 5. A hollow plunger 6 having an actuating cap 7 is slidably mounted within the bore of handle 5, and carries at its lower end a nut-like member 4 formed with screw threads or like formations corresponding to the threaded or similarly formed portion 9 of shaft 2. Plunger 6 is formed at its lower end with an external flange 6a which slidably mounts the plunger in the bore of the handle 5, and which cooperates with internal flange 5a of handle 5, to limit the upper or outward extent of movement of the plunger 6. A compression spring 3 is mounted within the bore of handle 5 around the threaded portion 9 of shaft 2, the compression spring abutting at one end against internal flange 5b of handle 5 and at the other end against nut-like member 4 of plunger 6. Tine assembly 1 has a tine portion formed with two relatively short outer tines 11 and a longer inner tine 10, the longer inner tine 10 providing a convenient rotational center for the tine assembly if the user desires to hold the fork substantially vertically against the plate when in use. Outer tines 11 and inner tine 10 are of wave form so as to cause the spaghetti or like material to cling to the fork.

Although substantially any suitable materials may be used, the tine assembly and its shaft, and the nut-like member 4, preferably are made of steel or other suitable metal, and all other parts, except spring 3, may be plastic. However, the selection of suitable materials will be obvious to persons skilled in the art. Threaded portion 9 of shaft 2 may be formed with screw threads as such, or it may constitute a generally flat member twisted so as to effect the spiral formations for mating with corresponding formations in nut-like member 4.

To use the rotating spaghetti fork in one convenient manner, one takes the handle 5 in his hand, places the thumb or forefinger on top of cap 7, and inserts the tines into the spaghetti or similar stringy food, holding the fork vertically. The cap 7, and hence plunger 6, are then pressed downwardly, causing the plunger 6 to move in a telescoping manner into handle 5, effecting rotation of shaft 2 and the entire tine assembly, and simultaneously compressing spring 3. Threaded portion 9 of shaft 2 preferably is formed such that depression of plunger 6 substantially to its full extent effects approximately two or more complete rotations of the tine assembly. As a result, the spaghetti or similar food is wound twice around and held securely by the wavy tines. The thumb or forefinger is then removed from cap 7, whereby compressed spring 3 will expand and return nut-like member 4 and plunger 6 upwardly to the starting position. The nut-like member and the plunger are free to rotate as they move back up the threaded portion 9 of the shaft 2. The fork and the entwined food are then lifted in the usual manner for consumption. However, if one so desires, he may depress the plunger 6 two or more times before lifting the spaghetti fork from the plate. Additionally, it is preferable, although not necessary, that the fork should be held with a slight incline to the plate surface at the end of the downward stroke of the plunger, so that when the thumb or forefinger is removed from the plunger cap, any tendency of the tine assembly to rotate rather than the plunger and nut-like member during the return stroke of the plunger will be prevented. It is to be noted, however, that the rotational resistance of the tine assembly with its entwined spaghetti is greater than the rotational resistance of the plunger and nut-like member during this return stroke, and hence there is little tendency for the entwined tine assembly to rotate.

Referring now to the embodiment of FIGS. 3–5, the basic construction consists of two separable parts, the handle 5' with all its drive components, and the fork or tine assembly 1' with its male coupler 17. Male coupler 17 has a short pin 18 projecting therefrom. Male coupler 17 mates with female coupler 15 carried by shaft 2'. Female coupler 15 has a bore which is only slightly larger in diameter than male coupler 17, and the female coupler has a slot 16 formed therein to receive pin 3. The clearances are such that a snug engagement is formed when the male coupler 17 is inserted in the female coupler 15. To separate the two, it is necessary merely to pull them apart in a straight line, thus permitting the tine assembly 1' to be washed without having to immerse the handle and its drive components in water.

As in the first embodiment, the embodiment of FIG. 3 includes a shaft 2' having a screw portion 9' which, as illustrated, is made of twisted flat stock of a rectangular shape. Screw portion 9' mates with nut-like member 4', which is correspondingly formed so as to effect a rotational movement of one member or the other upon relative axial movement of the two parts. Nut-like member 4' is carried by hollow plunger 6' having a cap 7'. Compression spring 3' is used to bias the plunger to its extended position, as in the first embodiment.

A different form of bearing arrangement is illustrated in the embodiment of FIG. 3. Thus shaft 2' is formed with a bearing plate or flange 12 which is situated in a bearing cavity 8' formed in handle 5'. A plastic roller bearing consisting of plastic retainer 13 and plastic balls 14 is situated between opposing surfaces of bearing plate 12 and bearing cavity 8'. As shown in FIG. 3, retainer 13 is split at 13a to permit assembly with shaft 2'.

The clearances between nut-like member 4' and plunger 6' and the corresponding bores of handle 5' are, of course, sufficient to avoid any binding or jamming when pressing down or releasing cap 7'.

In a preferred manner of assembly of the embodiment of FIG. 3, the plastic bearing is first mounted on shaft 2'. Compression spring 3' is then placed over screw portion 9', and nut-like member 4', together with plunger 6' and cap 7', is piloted onto the end of screw portion 9'. Handle 5' is, of course, fabricated as two identical halves, as illustrated in FIG. 4. With spring 3' partially compressed, the entire sub assembly is placed in one of the half handles, with the various parts in the proper cavities, and closed with the other handle half. The handle halves are then heat sealed together if made of plastic, or locked together by any various known methods if made of metal. Tine assembly 1' is then coupled to female coupler 15 in the previously described manner.

The embodiment of FIG. 3 is used in the same manner as previously described in connection with the embodiment of FIG. 1, and hence need not be repeated here.

An alternative form of screw member 20 and driver or nut-like member 19 is shown in FIG. 6. In accordance with this modification, the screw portion is formed of two twisted round wires, and drive member 19 is formed with mating passages such that relative axial movement between the two members necessarily effects relative rotation.

It will be readily understood that various features of one embodiment may be incorporated in the other embodiment, and accordingly the particular illustrated constructions for the different embodiments are not to be considered as mutually exclusive.

Among various contemplated modifications which do not affect the substance of the invention are variations in sizes and esthetic shapes so as to be usable by and to appeal to both adults and children. For instance, especially for children, the exterior configuration can be such as to resemble by shape and/or action popular cartoon characters.

Having thus described preferred embodiments of my invention in the manner required by the patent statutes, I claim:

1. A culinary device comprising a tine assembly having a shaft, a hollow handle, means rotatably supporting said shaft within said handle but preventing relative axial movement between said shaft and said handle, a manually actuatable axially movable member engaging said shaft and axially movable relative thereto, and means formed on said shaft and said actuatable member for rotating said shaft and hence said tine assembly upon manually actuated axial movement of said actuatable member.

2. A culinary device as claimed in claim 1 wherein said means formed on said shaft and said actuatable member comprise mating spiral-like formations.

3. A culinary device as claimed in claim 2 wherein said spiral-like formations comprise screw threads.

4. A culinary device as claimed in claim 1 further comprising means defining end stops limiting the axial movement of said actuatable member, and resilient means biassing said actuatable member to one of said end stops.

5. A culinary device as claimed in claim 4 wherein said actuatable member includes a hollow portion through which said shaft passes, and said resilient means comprises a spring mounted about said shaft and engaging said actuatable member.

6. A culinary device as claimed in claim 1 wherein said hollow handle is an elongate member formed with an axial through-bore, said shaft extending into said bore such that the tines of said tine assembly project from one end of the handle, and wherein said actuable member comprises a hollow plunger slidably mounted in said bore for telescoping movement relative to said handle, said plunger surrounding said shaft within said bore.

7. A culinary device as claimed in claim 6 further comprising resilient means within said bore biassing said plunger outwardly of said handle, and stop means for limiting the outward movement of said plunger.

8. A culinary device as claimed in claim 7 wherein said resilient means comprises a compression spring surrounding said shaft and bearing against the inner end of said plunger, and wherein said stop means comprises an internal flange in said bore at one end thereof cooperating with external projections carried by said plunger.

9. A culinary device as claimed in claim 8 wherein said external projections comprise a flange carried by said plunger for slidably supporting said plunger in said bore.

10. A culinary device as claimed in claim 9 wherein said means rotatably supporting said shaft within said handle comprises corresponding bearing surfaces formed on said shaft and in said handle.

11. A culinary device as claimed in claim 10 wherein said bearing surfaces comprises a convex bearing surface on said shaft seated in a concave bearing surface in said handle.

12. A culinary device as claimed in claim 10 wherein said bearing surfaces comprise a radial flange formed on said shaft seated in a groove formed in said handle.

13. A culinary device as claimed in claim 12 further comprising roller bearing means situated between opposing surfaces of said radial flange and said groove.

14. A culinary device as claimed in claim 1 wherein said tine assembly comprises a tine portion and said shaft, and wherein said tine portion is detachably connected to said shaft.

15. A culinary device as claimed in claim 1 wherein a portion of said shaft comprises two elongate members twisted together in spiral form.

16. A culinary device as claimed in claim 1 wherein said tine assembly includes a plurality of tines, each tine being of generally wave-form configuration.

References Cited

UNITED STATES PATENTS

| | | | |
|---|---|---|---|
| 2,602,996 | 7/1952 | Piche | 30—322 |
| 2,637,104 | 5/1953 | Samson | 30—322 |
| 2,710,449 | 6/1955 | Crino | 30—322 |

FOREIGN PATENTS 89,694    6/1967    France.

ROBERT C. RIORDON, Primary Examiner

J. C. PETERS, Assistant Examiner